United States Patent
Okuda et al.

(10) Patent No.: US 6,916,006 B2
(45) Date of Patent: Jul. 12, 2005

(54) ELECTROMAGNETIC VALVE DEVICE

(75) Inventors: Hideki Okuda, Kariya (JP); Hiroyoshi Murakami, Obu (JP)

(73) Assignee: Denso Corporation, Kariya (JP)

( * ) Notice: Subject to any disclaimer, the term of this patent is extended or adjusted under 35 U.S.C. 154(b) by 41 days.

(21) Appl. No.: 10/619,477

(22) Filed: Jul. 16, 2003

(65) Prior Publication Data

US 2004/0021109 A1 Feb. 5, 2004

(30) Foreign Application Priority Data

Jul. 31, 2002 (JP) .............................. 2002-223274

(51) Int. Cl.[7] .............................................. F16K 31/02
(52) U.S. Cl. ................................. 251/129.17; 251/337
(58) Field of Search ...................... 251/129.17, 129.15, 251/337

(56) References Cited

U.S. PATENT DOCUMENTS

| | | | | |
|---|---|---|---|---|
| 4,376,447 A | * | 3/1983 | Chumley | 251/129.15 |
| 4,635,683 A | * | 1/1987 | Nielsen | 251/129.15 |
| 4,858,886 A | * | 8/1989 | Tatara | 251/129.17 |
| 5,064,166 A | * | 11/1991 | Schechter | 251/129.15 |
| 5,992,461 A | * | 11/1999 | Gilmore et al. | 251/129.21 |
| 6,073,908 A | * | 6/2000 | Koga et al. | 251/337 |

FOREIGN PATENT DOCUMENTS

| | | |
|---|---|---|
| JP | 61-268863 | 11/1986 |
| JP | 2002-242790 | 8/2002 |

* cited by examiner

*Primary Examiner*—John Bastianelli
(74) *Attorney, Agent, or Firm*—Nixon & Vanderhye P.C.

(57) ABSTRACT

An electromagnetic valve device for reducing noise resulting from an internal collision of a movable core against a guide member has a fixed core, a cylindrical movable core, a valve member, for reciprocating in an axial direction of the movable core in a cooperative manner with the movable core to open and close fluid paths, coil sections for forming a magnetic field by electrical conduction thereof to attract the movable core to the fixed core so as to move the movable core in the axial direction, and a guide member having a guide wall for guiding the movable core in the axial direction from inside of the movable core in its radial direction. A space is formed inside the guide wall in its radial direction.

11 Claims, 10 Drawing Sheets

ELECTROMAGNETIC VALVE DEVICE

CROSS REFERENCE TO RELATED APPLICATION

This application is based upon, claims the benefit of priority of, and incorporates by reference, the contents of Japanese Patent Application No. 2002-223274 filed Jul. 31, 2002.

BACKGROUND OF THE INVENTION

1. Field of the Invention

The present invention relates to an electromagnetic valve device for opening and closing a fluid path.

2. Description of the Related Art

Electromagnetic valve devices, as described below, are known for opening and closing a fluid path by a valve member. In such an electromagnetic valve device, a movable core is attracted to, and separated from, a fixed core by electrical conduction of a coil section. The valve member moves cooperatively with the movable core to open and close the fluid path.

FIG. 10 shows an example of a known electromagnetic valve device 1, in which a movable core 2 is formed in a cylindrical form. The movable core 2 is guided in its axial direction by a cylindrical guide wall 4 of a guide member 3 that is provided inside the movable core 2 in its radial direction. A valve member 6 is abutted on a regulating member 5 provided inside the guide wall 4 in its radial direction so as to regulate the axial movement of the valve member 6 and the movable core 2.

In the electromagnetic valve device 1 shown in FIG. 10, a fixed core 7 and the regulating member 5 are in close contact with each other inside the guide wall 4 in its radial direction. Therefore, when one end side 8 of the movable core 2 is deviated in the radial direction by some form of side force and causes a collision against the guide wall 4 while the movable core 2 is traveling in its axial direction, vibration from the impact with the guide wall 4 propagates to the fixed core 7 and the regulating member 5.

As shown in FIG. 10, since the fixed core 7 is covered with a body 9 made of a resin, the vibration propagated to the fixed core 7 is transmitted to the body 9 and is emitted therefrom to the exterior as a sound leak. Moreover, as shown in FIG. 10, since the regulating member 5 is formed by integral resin molding with the body 9, the vibration propagated to the regulating member 5 is also emitted from the body 9 to the exterior as a sound leak. Although the sound leak from the body 9 results in noise, no satisfactory means of overcoming this issue exists.

SUMMARY OF THE INVENTION

An object of the present invention is to provide an electromagnetic valve device for reducing noise that results from the collision of a movable core with a guide member.

In an electromagnetic valve device according to a first aspect of the present invention, a space is formed inside a guide wall of a guide member in its radial direction in the case where the guide wall guides a cylindrical movable core from inside in its radial direction, whereas a space is formed outside the guide wall of the guide member in its radial direction in the case where the guide wall guides the movable core from outside in its radial direction. Furthermore, the guide wall is formed so as to be elastically deformable. When the guide wall is pressed by the radially displaced movable core, the guide wall is deflected through the space inside or outside the guide wall in its radial direction.

Therefore, the deflection of the guide wall in the space can attenuate the vibration of the guide wall at the time of collision of the movable core. Moreover, the space inside or outside the guide wall in its radial direction (hereinafter, also referred to as a space for deflection) can prevent the vibration from propagating from the guide wall to other members. Therefore, according to the electromagnetic valve device of the first aspect, noise resulting from the collision of the movable core against the guide member can be reduced.

In an electromagnetic valve device according to a second aspect of the present invention, the guide wall and the space for deflection are formed so as to be continuous in a circumferential direction of the movable core. As a result, the guiding effects of the movable core and the vibration attenuating effects at the time of collision of the movable core can be demonstrated at an arbitrary portion in the circumferential direction of the movable core.

In an electromagnetic valve device according to a third aspect of the present invention, an elastic member smaller than the space for deflection is provided in the space for deflection. As a result, the vibration at the time of collision of the movable core is attenuated not only by the guide wall but also by the elastic member to enhance the vibration attenuating effects.

In an electromagnetic valve device according to a fourth aspect of the present invention, the guide member is formed separately from a body covering the fixed core and a coil section. With such a configuration, for example, by providing the guide member and the body so as to be separated from each other, the vibration at the time of collision of the movable core can be prevented from being directly propagated from the guide member to the body, resulting in reduction of sound leaks from the body.

In an electromagnetic valve device according to a fifth aspect of the present invention, the guide member is formed by integral resin molding with the body covering the fixed core and the coil section. As a result, the number of components constituting the electromagnetic valve device can be decreased to reduce fabrication costs.

In an electromagnetic valve device according to a sixth aspect of the present invention, the guide member is formed by integral resin molding with a regulating member for regulating the axial movement of the movable core. As a result, a movement regulating function for the movable core can be added to the device while preventing the fabrication cost from increasing.

In an electromagnetic valve device according to a seventh aspect of the present invention, a plurality of support members for respectively supporting a plurality of portions of the movable core in the axial direction are provided so that rigidity of the movable core in the radial direction is higher than that in the axial direction. With such support members, the collision speed, when the movable core is displaced so as to incline its central axis to collide against the guide member, can be reduced. Therefore, generations of vibrations in the guide wall can be restrained. Accordingly, the effects of reducing noise resulting from the collision of the movable core against the guiding member can be enhanced.

In an electromagnetic valve device according to an eighth aspect of the present invention, a plurality of support members for respectively supporting a plurality of portions of the movable core in the axial direction are provided so that rigidity of the movable core in the radial direction is higher than that in the axial direction. With such support members, the collision speed, when the movable core is displaced so as to incline its central axis to collide against the guide member inside or outside the movable member in its radial direction, can be reduced. Therefore, the generation of vibration in the guide wall can be restrained. Accordingly, according to the electromagnetic valve device of the eighth aspect, noise resulting from the collision of the movable core against the guiding member can be reduced.

In an electromagnetic valve device according to a ninth aspect of the present invention, at least one of the plurality of support members is constituted by a relatively inexpensive flat spring or coil spring. This helps to keep fabrication costs low.

In an electromagnetic valve device according to a tenth aspect of the present invention, the coil spring has such a shape that a coil diameter decreases from its one end side toward the other end side in a coil axis direction that coincides with the axial direction of the movable core. As a result, since rigidity of the movable core in the radial direction can be sufficiently increased as compared with that in the axial direction, the effects of reducing the collision speed of the movable core are increased, which in turn improves the effects of reducing noise.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Hereinafter, a plurality of examples illustrating embodiments of the present invention will be described with reference to the accompanying drawings. The following description of the preferred embodiments is merely exemplary in nature and is in no way intended to limit the invention, its application, or uses.

(First Embodiment)

Figure 1:
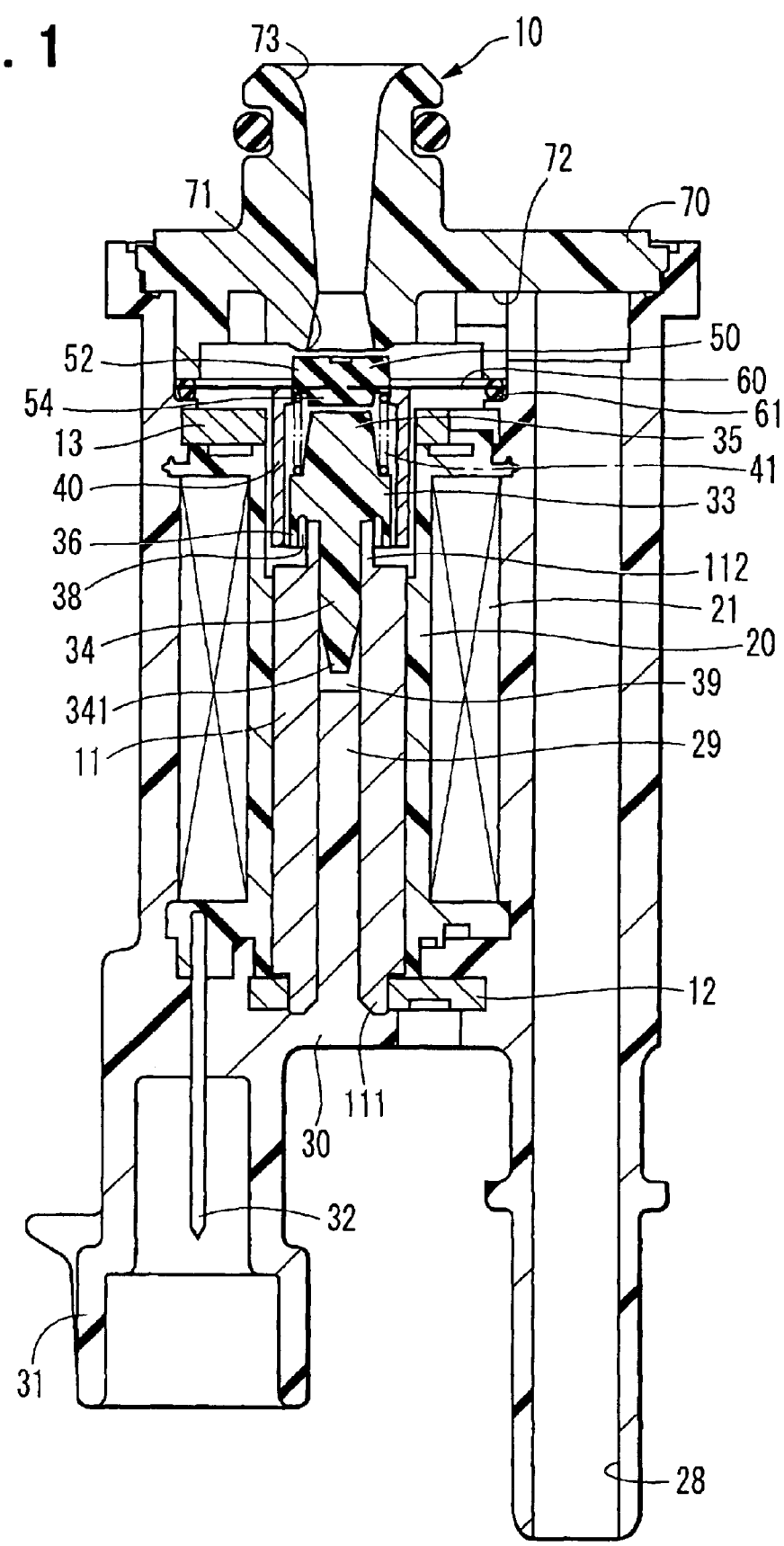
FIG. 1 is a cross-sectional view showing an electromagnetic valve device according to a first embodiment of the present invention.
Figure 2:
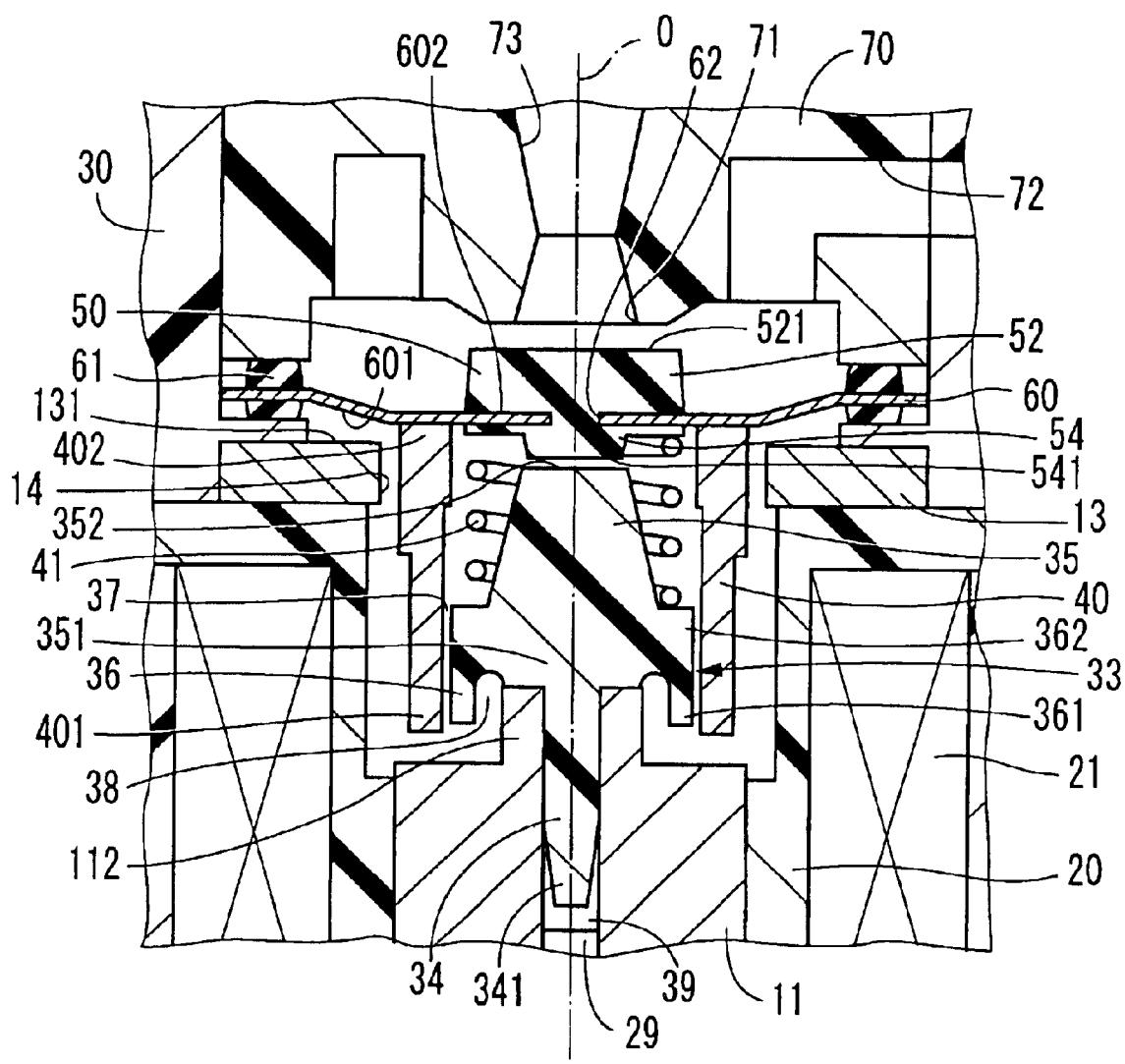
FIG. 2 is a cross-sectional view schematically showing a principal part of the electromagnetic valve device according to the first embodiment of the present invention.

An electromagnetic valve device according to one embodiment of the present invention is shown in FIGS. 1 and 2. An electromagnetic valve device 10 of a first embodiment is used in a system for feeding a vaporized fuel generated in, for example, a fuel tank of a vehicle to an engine. The electromagnetic valve device 10 is a valve device for opening and closing a flow path of the vaporized fuel.

A path member 70, which is formed of a resin, includes a valve seat 71, and an inflow path 72 and an outflow path 73, both serving as fluid paths. The valve seat 71 is provided between a downstream end of the inflow path 72 and an upstream end of the outflow path 73 so that a valve member 50 can be seated thereon. When the valve member 50 is seated on the valve seat 71, communication between the downstream portion of the inflow path 72 and the upstream portion of the outflow path 73 is blocked, thus closing the fluid paths. When the valve member 50 is lifted from the valve seat 71, the downstream portion of the inflow path 72 and the upstream portion of the outflow path 73 are brought into communication with each other to open the fluid paths.

Each of a fixed core 11, a yoke 12, and a core plate 13 is made of a magnetic material. The fixed core 11 is made in a cylindrical shape. The yoke 12 is fixed to a minor diameter portion 111 on one end of the fixed core 11 by caulking, press-fitting or the like. The core plate 13 is provided on the other end of the fixed core 11. A through hole 14 is provided through the core plate 13 in its thickness direction. A bobbin 20 around which a coil 21 is wound is provided on the outer circumferential side of the fixed core 11 so as to be sandwiched between the yoke 12 and the core plate 13. The bobbin 20 and the coil 21 constitute a coil section.

A body 30, which is made of a resin, covers the fixed core 11, the yoke 12, the core plate 13, the bobbin 20, and the coil 21. The body 30 is joined to a path member 70 to form an inflow port 28 in communication with the upstream end of the inflow path 72. A part 29 of the body 30 occupies a space (with the exception of the other end of the fixed core 11) on an inner circumferential side of the fixed core 11 so as to constitute the filling portion 29. A terminal 32 is partially buried in a connector section 31 formed in the body 30 so as to provide an electrical connection to the coil 21. In the first embodiment, a current is supplied to the coil 21 for a period of time in accordance with a control command value by a control device (not shown), which is electrically connected to the terminal 32.

A movable core 40 is made of a magnetic material in a cylindrical shape. The movable core 40 is located inside the inner circumference of the through hole 14 that is provided through the core plate 13. When the movable core 40 is in a normal position as shown in FIG. 2, the movable core 40 becomes coaxial with the fixed core 11. One end 401 of the movable core 40 opposed to the other end of the fixed core 11 is in sliding contact with the guide wall 36 on its inner circumferential side so as to be guided in a central axis 0-direction in a normal position (shown in the drawings by the line marked "0," and hereinafter, referred to simply as a central axis 0-direction). A minor diameter portion 112 of the fixed core 11 on the other end side is inserted into the end 401 of the movable core 40 on its inner circumferential side.

A guide member 33, formed separately from the body 30, includes a held portion 34, a regulating section 35, and a guide wall 36, which are obtained by integral resin molding. The held portion 34 is formed in a rod-like shape, and is inserted into the minor diameter portion 112 of the fixed core 11 on its inner circumferential side so as to be held therein. In the fixed core 11, an insertion tip 341 of the held portion 34 provides a gap 39 between the filling portion 29 of the body 30 and the insertion tip 341.

The regulating section 35 serving as a regulating member is formed in a cylindrical shape projecting from the minor diameter portion 112 toward the valve member 50 so as to be provided on the inner circumferential side of the movable core 40. A projecting tip end face 352 of the regulating section 35 is formed in a flat plane perpendicular to the central axis 0 of the movable core 40 in a normal position.

The guide wall 36 is formed in a cylindrical shape continuously surrounding the outer circumferential side of the regulating section 35. The guide wall 36 is provided on the inner circumferential side of the movable core 40, i.e., inside the movable core 40 in its radial direction so as to be coaxial with the movable core 40 in its normal position. The guide wall 36 provides an extremely small clearance 37 between the end 401 of the movable core 40 and the guide wall 36. With such an arrangement, the guide wall 36 is capable of guiding the end 401 of the movable core 40 from inside of the movable core 40 in its radial direction.

Figure 3:
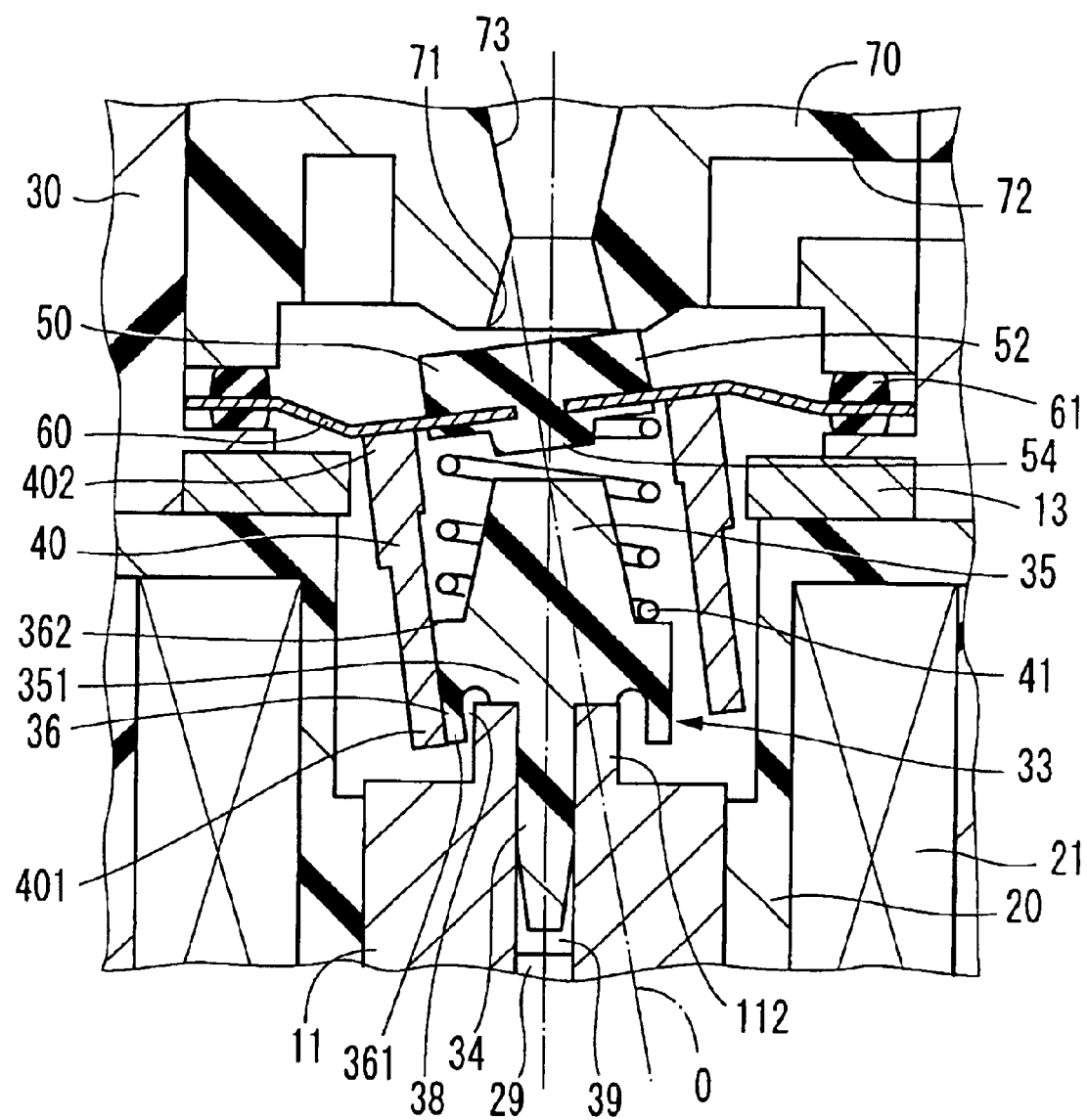
FIG. 3 is a cross-sectional view illustrating the operation of the electromagnetic valve device according to the first embodiment of the present invention, corresponding to FIG. 2.

An unfixed core side end 362 of the guide wall 36 is connected to an outer circumferential wall of a base end 351 of the regulating section 35. A fixed core side end 361 of the guide wall 36 forms a space 38 having a circular cross section with the minor diameter portion 112 that is provided coaxially with the fixed core side end 361. Specifically, the circumferentially continuous space 38 is provided inside the fixed core side end 361 in its radial direction. In this embodiment, the fixed core side end 361 of the guide wall 36, which is made of a resin, is elastically deformable. As a result, the fixed core side end 361 of the guide wall 36 can be deflected through the space when pressed by the end 401 of the movable core 40 that is displaced in the radial direction as shown in FIG. 3.

A disk-like elastic support member 60 is provided in the form of a flat spring. An outer circumferential edge of the support member 60 is interposed between the body 30 and the path member 70 through a rubber ring member 61. The support member 60 extends between the unfixed core side end 402 of the movable core 40 and the valve seat 71, the support member 60 having one face 601 opposed to the projecting tip end face 352 of the regulating section 35 and a face 131 of the core plate 13 on the unfixed core side. Due to the support member 60 in such an arrangement, the rigidity of the movable core 40 in the radial direction is higher than that of the movable core 40 in the central axis 0-direction that coincides with the thickness direction.

The unfixed core side end 402 of the movable core 40 is fixed and supported on the face 601 of the support member 60 by welding or the like. On the inner circumferential side of the movable core 40, an energizing member 41 is interposed between an abutting portion 54 of the valve member 50 and the unfixed core side end 362 of the guide wall 36. The energizing member 41, which is constituted by a coil spring having a constant coil diameter, energizes the movable core 40 toward the valve seat 71.

The valve member 50 is fitted into a through hole 62 of the support member 60 so as to be fixed thereto. The valve member 50 is capable of reciprocating movement in the central axis 0-direction in a cooperative manner with the movable core 40. The valve member 50 is made of rubber and includes a seat section 52 and the abutting portion 54. The seat section 52 is formed in a disk-like shape projecting from a face 602 of the support member 60 opposite to the face 601 toward the valve seat 71. A projecting tip end face 521 of the seat section 52 can be seated on the valve seat 71. The abutting portion 54 is formed in a disk-like shape projecting from the face 601 of the support member 60 toward the regulating section 35. The abutting section 54 is housed coaxially within the movable core 40. In the abutting section 54, the projecting tip end face 541 in a flat, plane shape perpendicular to the central axis 0 of the movable core 40 can abut on the projecting tip end face 352 of the regulating section 35.

Next, an operation of the electromagnetic valve device 10 will be described.

(1) When the coil 21 is not electrically conducted, the movable core 40 is separated from the fixed core 11 while the support member 60 is slightly deflected toward the valve seat section 71 due to an energizing force of the energizing member 41. At this time, the valve member 50 is separated from the regulating section 35 so as to be seated on the valve seat section 71. As a result, communication between the inflow path 72 and the outflow path 73 is blocked to close the fluid paths. Therefore, the fluid supplied from the inlet port 28 to the inflow path 72 does not flow out from the downstream side of the outflow path 73.

(2) When the coil 21 is electrically conducted, the coil 21 generates a magnetic field for attracting the movable core 40 to the fixed core 11. As a result, the movable core 40 moves in the central axis 0-direction to approach the fixed core 11 while deflecting the support member 60 toward the regulating section 35 against the energizing force of the energizing member 41. The valve member 50 moves toward the regulating section 35 along with the deflection of the support member 60, so that the seat section 52 is separated from the valve seat 71. As a result, the inflow path 72 and the outflow path 73 are brought into communication with each other to open the fluid paths, so that a fluid supplied from the inflow port 28 to the inflow path 72 flows out from the downstream side end of the outflow path 73. The abutting section 54 of the valve member 50 abuts on the regulating section 35 of the guide member 33 to regulate the movement of the movable core 40 and the valve member 50.

In the above-described electromagnetic valve device 10, the movable core 40 traveling in the central axis 0-direction is subjected to a side force in the radial direction generated by the electric field of the coil 21 and may cause the central axis 0 of the movable core 40 itself to become slanted as shown in FIG. 3. When the central axis 0 is inclined in this way, the fixed core side end 401 of the movable core 40, which is not supported by the support member 60, is greatly displaced in the radial direction to collide against the guide wall 36, thereby pressing against the guide wall 36. As a result, the fixed core side end 361 of the guide wall 36 is deflected through the space 38 inside the fixed core side end 361 in the radial direction to provide damping effects. Owing to the damping effects of the guide wall 36, the vibrational energy generated in the guide wall 36, due to collision of the movable core 40, can be attenuated. By providing a damping function for the guide wall 36 in this manner, the effects of improving the durability of the guide wall 36 can also be obtained.

Moreover, since the space 38 is formed between the fixed core side end 361 of the guide wall 36 and the minor diameter portion 112 of the fixed core 11 in the electromagnetic valve device 10, the vibration can be prevented from being directly propagated from the guide wall 36 to the fixed core 11. Furthermore, in the electromagnetic valve device 10, the guide member 33 is formed separately from the body 30, and the gap 39 is formed between the held portion 34 of the guide member 33 and the filling portion 29 of the body 30. Therefore, the vibration propagated to the guide wall 36 can be prevented from being directly transmitted to the body 30. As described above, according to the electromagnetic valve device 10, since the vibration can be restrained from being propagated from the guide wall 36 to the fixed core 11 and the body 30, the sounds generated by the vibration of the guide wall 36 hardly leak from the body 30 to the exterior.

As described above, according to this embodiment of the electromagnetic valve device 10, noise resulting from the collision of the movable core 40 against the guide wall 36 can be reduced.

Next, a method for setting an elastic property of the fixed core side end 361 of the guide wall 36 will be described. In this embodiment, a method for setting an elastic property in the case where noise is reduced by 3 dB or more in comparison with that in a conventional example shown in FIG. 10 will be described by way of example. For convenience, the fixed core side end 401 of the movable core 40 is referred to as the movable core end 401, and the fixed core side end 361 of the guide wall 36 is referred to as the guide wall end 361 in the following description.

The kinetic energy Em created when the movable core 40 is subjected to a sufficient side force to be displaced is expressed by the following Formula 1, in which Eb is elastic energy of the guide wall end 361 in its radial direction, which is generated by the deflection, Ev is vibrational energy generated in the guide wall 36 due to collision, and El is other energies.

[Formula 1]

$$E_m = E_b + E_v + E_l \quad (1)$$

The kinetic energy Em and the elastic energy Eb are expressed by Formula 2 and Formula 3 below, respectively. In the electromagnetic valve device 10, it is sufficient to consider an elastic energy of the support member 60 constituted by a flat spring in its radial direction as the energy El which is expressed by Formula 4 below. In Formulas 2 to 4, x, including x1 and x2, represents the amount of displacement of the movable core end 401 in the radial direction, where x1 represents the amount of displacement when the movable core 40 starts contacting the guide wall end 361, and x2 represents the amount of displacement when the guide wall end 361 is at the maximum deflection. Moreover, F(x) in Formula 2 represents a side force acting on the movable core end 401 when the movable core end 401 is at the position corresponding to the amount of displacement x. Furthermore, K1 in Formula 3 represents a spring constant of the guide wall end 361 in the radial direction, and K2 in Formula 4 represents a spring constant of the support member 60 in the radial direction.

[Formula 2]

$$E_m = \int_0^{x2} \{F(x) \cdot x\} dx \quad (2)$$

-continued

[Formula 3]

$$E_b = \frac{1}{2} \cdot K_1 \cdot (x2 - x1)^2 \quad (3)$$

[Formula 4]

$$E_l = \frac{1}{2} \cdot K_2 \cdot (x2)^2 \quad (4)$$

Figure 10:
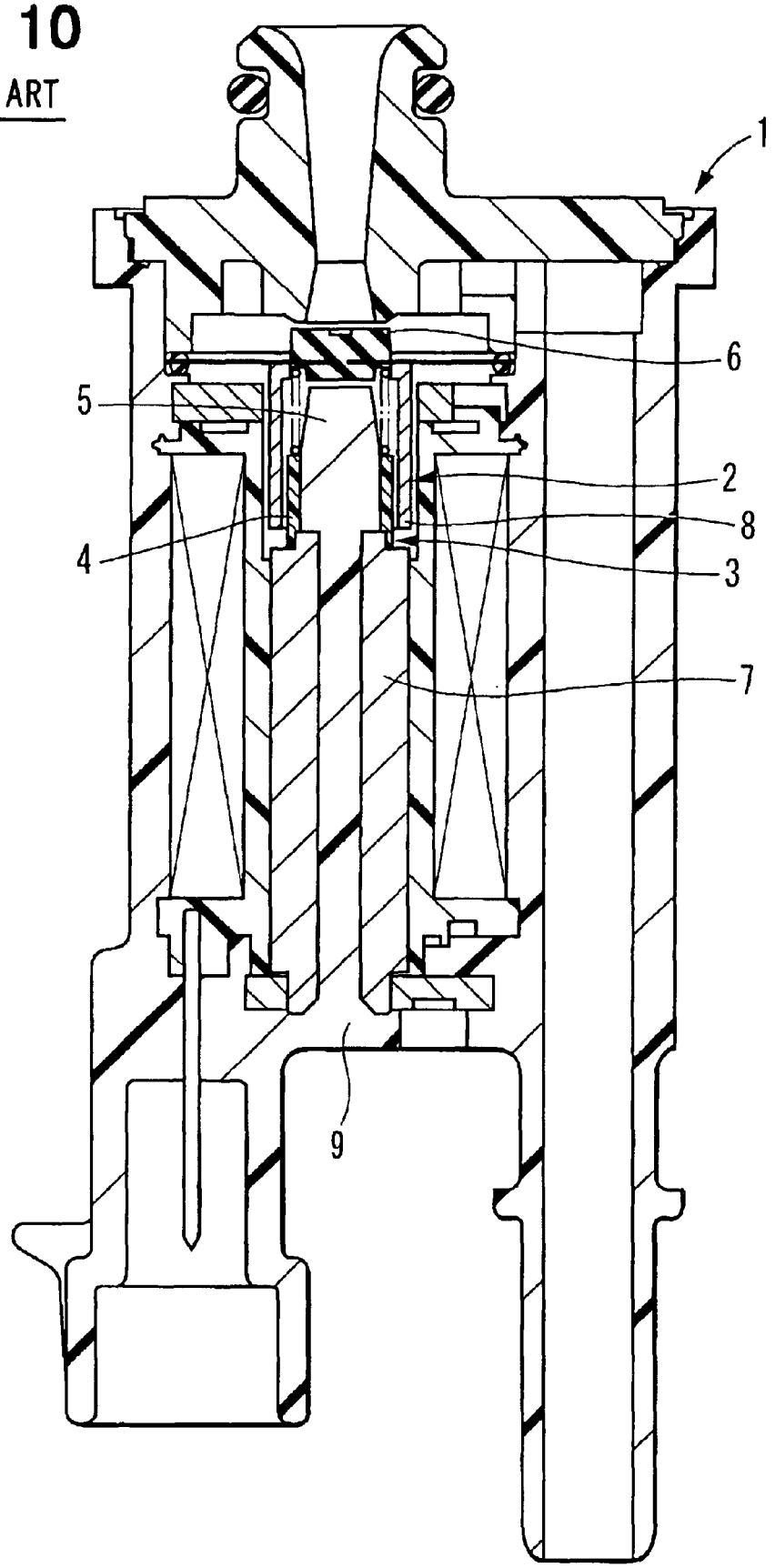
FIG. 10 is a cross-sectional view showing a conventional electromagnetic valve device.

In the electromagnetic valve device of the present invention, in order to obtain a 3 dB or more noise reduction with respect to that in the conventional example shown in FIG. 10; it is necessary to satisfy the following Formula 5.

[Formula 5]

$$E_v < \frac{1}{2}(E_m - E_l) \quad (5)$$

Therefore, in the electromagnetic valve device 10, the spring constant K1 of the guide wall end 361 in the radial direction is set based on the above-described Formulae 2 to 4 so as to establish the following Formula 6 derived from the above-described Formula 1 and Formula 5.

[Formula 6]

$$E_b > \frac{1}{2}(E_m - E_l) \quad (6)$$

Figure 4:
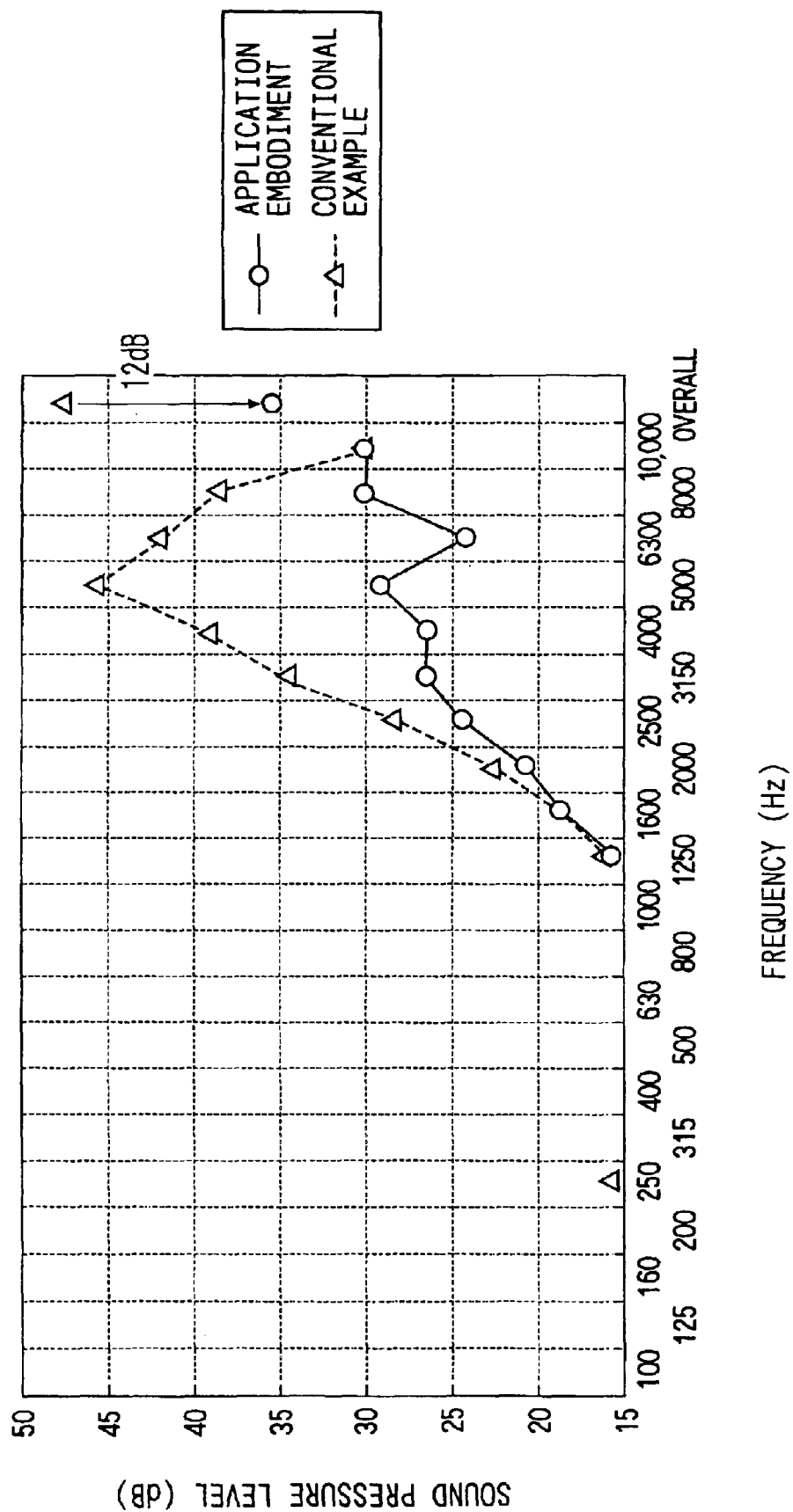
FIG. 4 is a graph showing measurement results of a sound pressure level of a sound leak from the electromagnetic valve device of the first embodiment of the present invention and that from an electromagnetic valve device of a conventional example.

Next, the noise reduction effects of the electromagnetic valve device 10 in comparison with the conventional example shown in FIG. 10, will be described below in which the elastic property of the guide wall 36 is determined in accordance with the above-described method. FIG. 4 shows the results of measurements of sound pressure levels of sound leaks when the electromagnetic valve device 10 of this embodiment and the conventional electromagnetic valve device are operated. The results of measurements of the sound pressure levels are represented by a value obtained by adding a triple of a standard deviation to a mean value of a plurality of measured values, for a level value at a predetermined frequency in the range of 0 to 10000 Hz and an overall value at 0 to 10,000 Hz. As shown in FIG. 4, the effects of reduction of about 12 dB in overall value are obtained in this embodiment in comparison with the conventional example.

(Second Embodiment)

Figure 5:
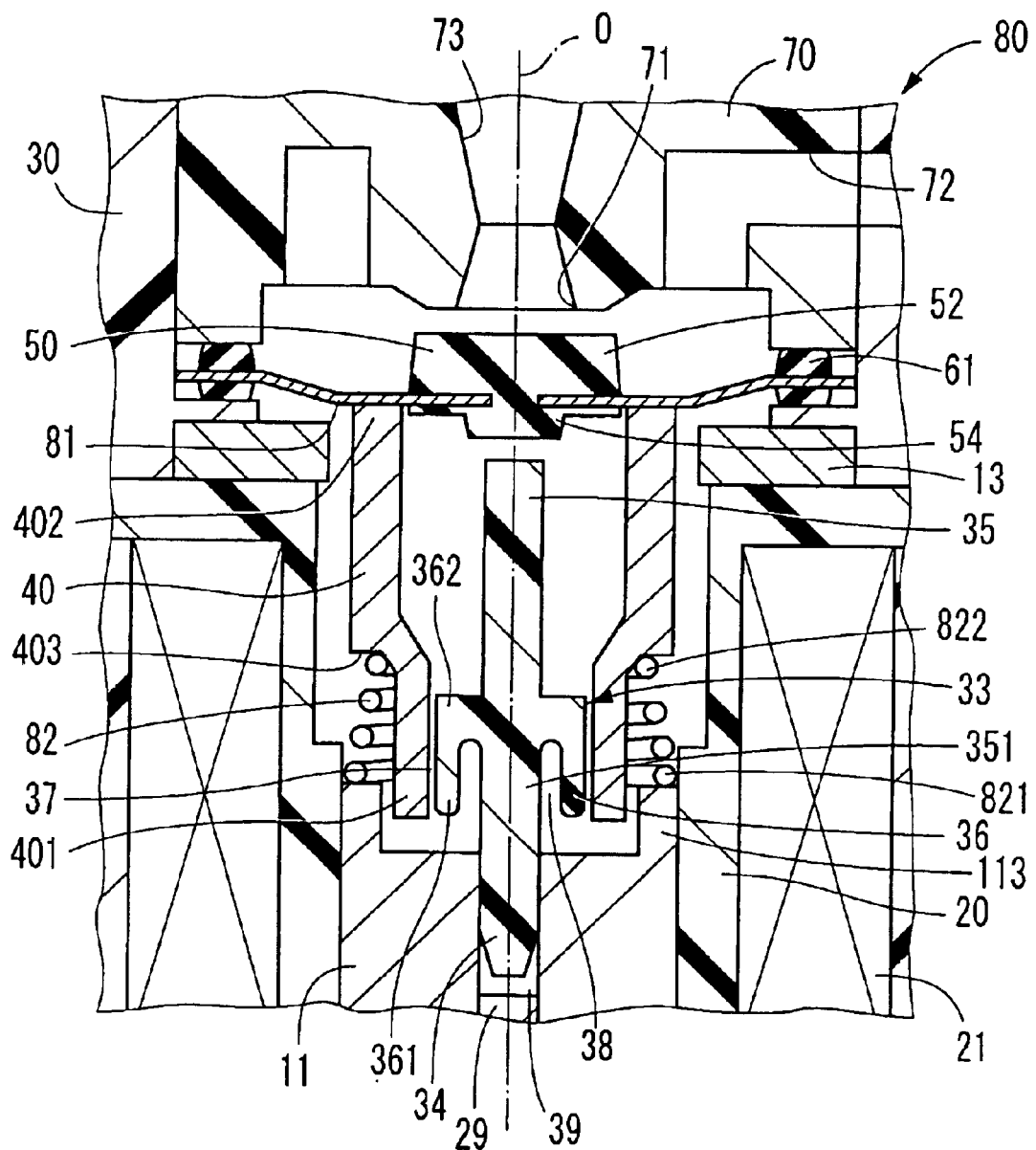
FIG. 5 is a cross-sectional view showing a principal part of an electromagnetic valve device according to a second embodiment of the present invention.

FIG. 5 shows an electromagnetic valve device according to a second embodiment of the present invention. Components substantially the same as those in the first embodiment are denoted by the same reference numerals.

In an electromagnetic valve device 80 of the second embodiment, the movable core end 401 of the movable core 40, which is opposed to the fixed core 11, is formed to have a smaller diameter than that of the other end 402. A step portion 403 is formed on the outer circumferential side wall. Moreover, in place of the minor diameter portion 112 in the first embodiment, a cylindrical stopper portion 113 surrounding the outer circumferential side of the end 401 of the movable core 40 is coaxially provided for the end of the fixed core 11, which is opposed to the movable core 40 in the electromagnetic valve device 80. Furthermore, in the electromagnetic valve device 80, the fixed core side end 361 of the guide wall 36 forms the space 38 having a circular cross section with the base end 351 of the regulating section 35, which is coaxially placed with the fixed core side end 361.

Moreover, the electromagnetic valve device 80 includes a first support member 81 corresponding to the support member 60 in the first embodiment and a second support member 82 in place of the energizing member 41 in the first embodiment. The first support member 81 and the second support member 82 support two portions of the movable core 40, which are separated from each other in the central axis 0-direction.

Specifically, the first support member 81 is constructed of a flat spring, similar to the support member 60 in the first embodiment. The rigidity of the movable core 40 in its radial direction is higher than that of the movable core 40 in the central axis 0-direction that coincides with the thickness direction.

The second support member 82 is constructed of a coil spring, or a coil-shaped elastic material. In this embodiment, the second support member 82 is a so-called trapezoidal spring having a gradually decreasing coil diameter from one end 821 in a coil axis direction toward the other end 822. In the second support member 82, the end 821 having a larger diameter is stopped by the stopper portion 113 of the fixed core 11, whereas the other end 822 having a smaller diameter is stopped by the step portion 403 of the movable core 40. As a result, the second support member 82 is positioned coaxially with the movable core 40 in a normal position to support the movable core 40. In the second support member 82 in such an arrangement, the rigidity of the movable core 40 in the radial direction coinciding with the coil diameter direction is sufficiently higher than that of the movable core 40 in the central axis 0-direction coinciding with the coil axis direction. Moreover, the second support member 82 energizes the movable core 40 toward the valve seat 71.

In the above-described electromagnetic valve device 80, when a side force inclines the central axis 0 of the movable core 40, each of the first and second support members 81, 82 demonstrates the damping effects. The damping effects restrain the displacement of both ends 401 and 402 of the movable core 40 in its radial direction due to the increased rigidity in the radial direction. Owing to the damping effects, the collision speed, when the fixed core side end 401 of the movable core 40 collides against the guide wall 36, is thus decreased. Therefore, the vibrational energy generated in the guide wall 36 due to collision of the movable core 40 can be reduced to promote the reduction of noise.

(Third Embodiment)

Figure 6:
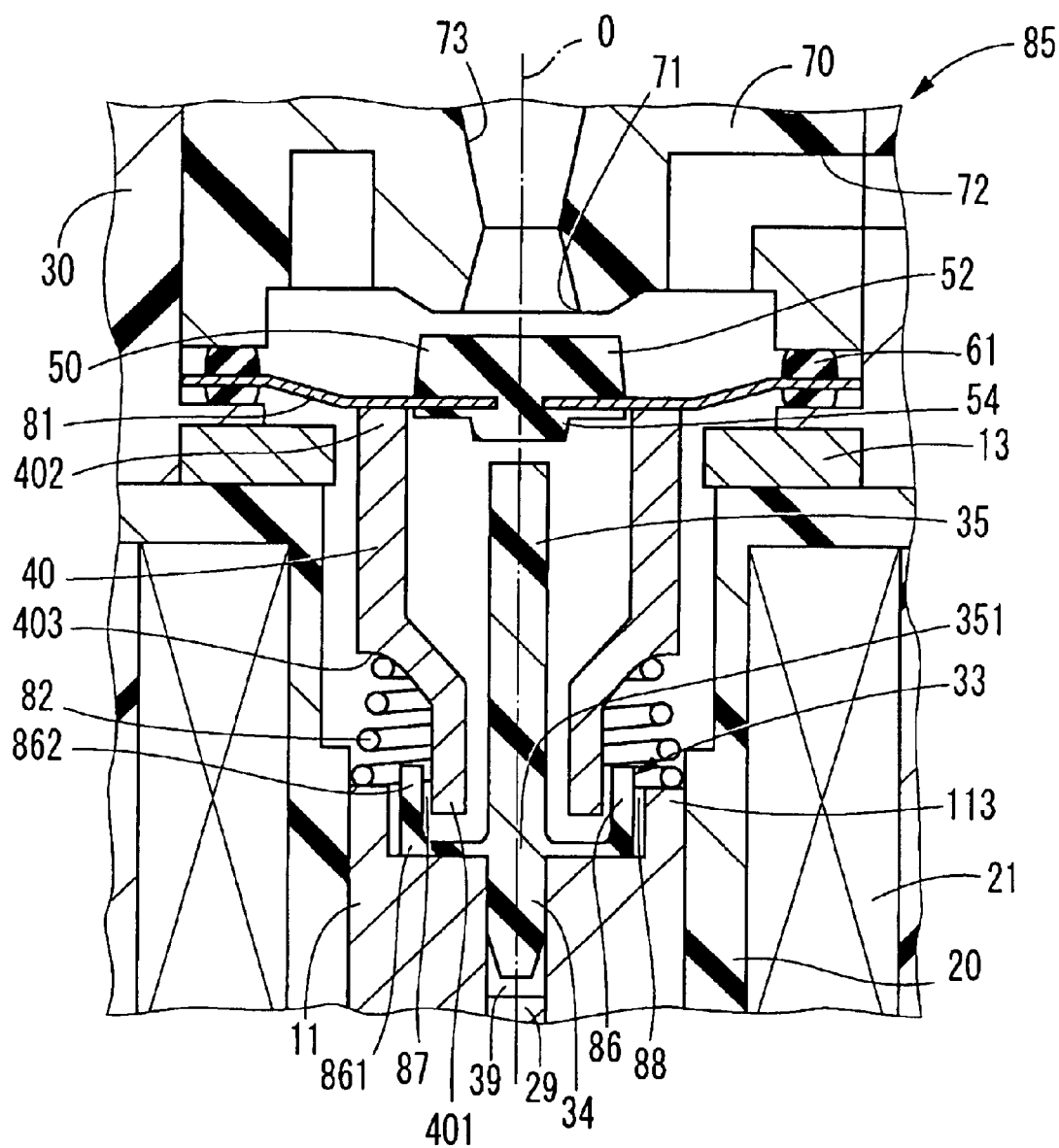
FIG. 6 is a cross-sectional view showing a principal part of an electromagnetic valve device according to a third embodiment of the present invention.

FIG. 6 shows an electromagnetic valve device according to a third embodiment of the present invention. Components substantially the same as those of the first and second embodiments are denoted by the same reference numerals.

An electromagnetic valve device 85 of the third embodiment differs from that of the second embodiment in the structure of the guide wall of the guide member 33.

A guide wall 86 of the third embodiment is formed in a cylindrical form to continuously surround the outer circumferential side, i.e., the outer side of the movable core 40 in the radial direction. The guide wall 86 is provided coaxially with the movable core 40, in a normal position, so as to provide an extremely small clearance 87 with the end 401, which has a smaller diameter than other portions of the movable core 40. In such an arrangement, the guide wall 86 is capable of guiding the end 401 of the movable core 40 from the outside in the radial direction to the central axis 0-direction. In the guide wall 86, the fixed core side end 861 is connected to the outer circumferential wall of the base end 351 of the regulating section 35. Moreover, the unfixed core side end 862 of the guide wall 86 forms a space 88 having a circular cross section with the stopper portion 113 of the fixed core 11 that is coaxially placed with the unfixed core side end 862. Specifically, the space 88, which is continuous in a circumferential direction, is provided outside the unfixed core side end 862 in the radial direction.

Also in this embodiment, the guiding member 33, including the guide wall 86, is made of a resin. The unfixed core side end 862 of the guide wall 86 is elastically deformable. As a result, the unfixed core side end 862 of the guide wall 86 can be deflected through the space 88 when pressed by the fixed core side end 401 of the movable core 40 that is displaced in the radial direction.

In the above-described electromagnetic valve device 85, when a side force inclines the central axis 0 of the movable core 40, the end 401 of the movable core 40 that is displaced in the radial direction collides against the guide wall 86 to press the guide wall 86. As a result, the unfixed core side end 862 of the guide wall 86 is deflected through the space 88 outside the unfixed core side end 862 in the radial direction to provide the damping effects. Owing to the damping effects of the guide wall 86, the vibrational energy generated in the guide wall 86 due to collision of the movable core 40 can be attenuated.

(Fourth Embodiment)

Figure 7:
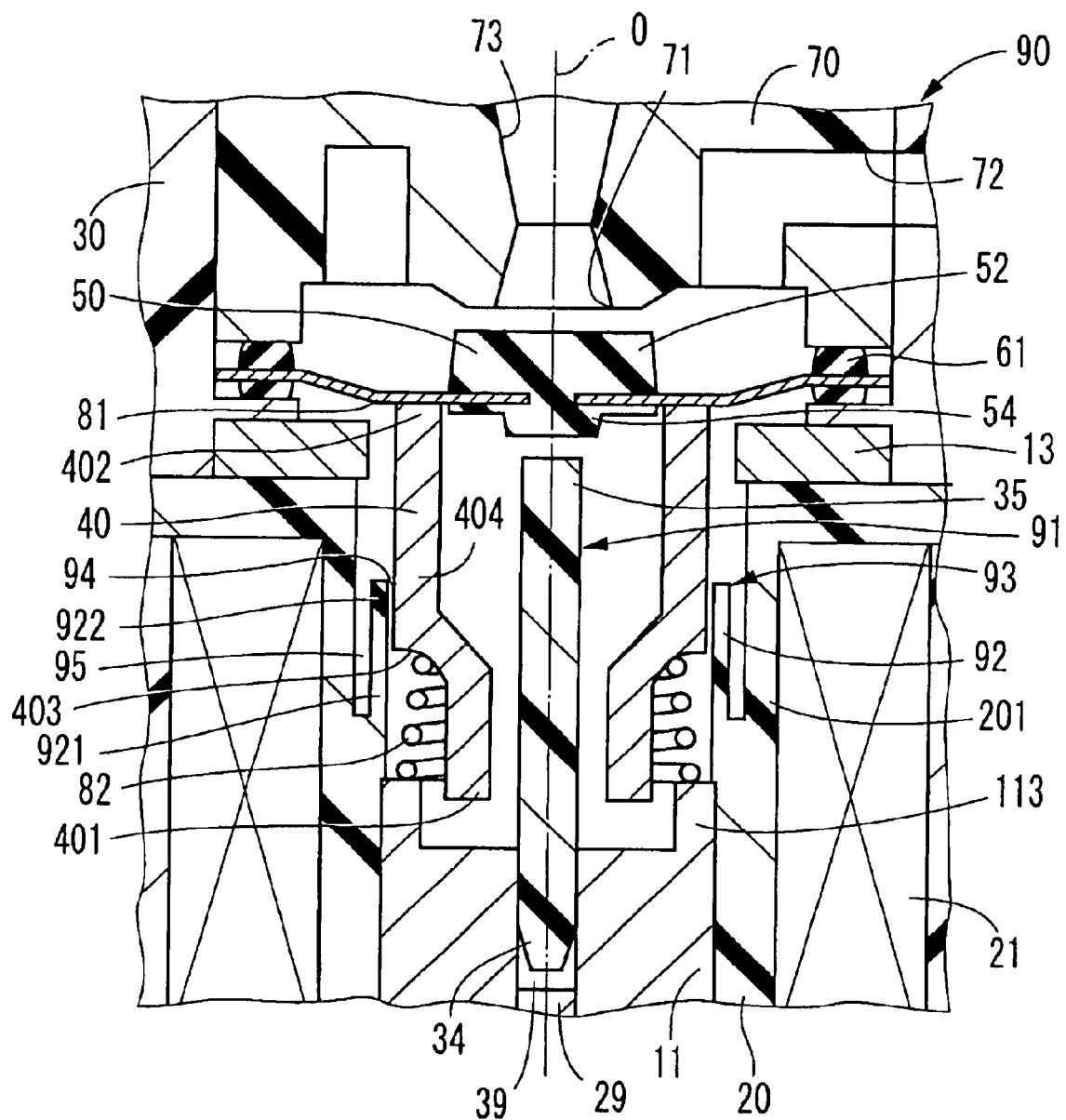
FIG. 7 is a cross-sectional view showing a principal part of an electromagnetic valve device according to a fourth embodiment of the present invention.

FIG. 7 shows an electromagnetic valve device according to a fourth embodiment of the present invention. Components substantially the same as those in the first and second embodiments are denoted by the same reference numerals.

An electromagnetic valve device 90 of the fourth embodiment differs from that of the second embodiment in the structures of the regulating member (regulating section) and the guide wall. Specifically, in the electromagnetic valve device 90, a regulating member 91 made of a resin includes the held portion 34 and the regulating section 35 in an integral manner. Furthermore, in the electromagnetic valve device 90, a guide member 93 composed of a guide wall 92 is formed by integral resin molding with the bobbin 20. The guide wall 92 of the guide member 93 is formed in a cylindrical form continuously surrounding the outer circumferential side of the movable core 40, that is, the outer side of the movable core 40 in its radial direction.

The guide wall 92 is provided coaxially with the movable core 40 in a normal position, and provides an extremely small clearance 94 with a major diameter portion 404 of the movable core 40 which is closer to the end 402 than to the step portion 403. With such an arrangement, the guide wall 92 is capable of guiding the major diameter portion 404 of the movable core 40 from the outside in the radial direction toward the central axis 0-direction. A fixed core side end 921 of the guide wall 92 is connected to an inner circumferential wall of a body 201 of the bobbin 20. An unfixed core side end 922 of the guide wall 92 forms a space 95 having a circular cross section with the bobbin body 201 that is coaxially formed with the unfixed core side end 922. Specifically, the space 95 is continuous in the circumferential direction and is located outside the unfixed core side end 922 in its radial direction. The unfixed core side end 922 of the guide wall 92 made of a resin is elastically deformable so as to be deformed through the space 95 when pressed by the major diameter portion 404 of the radially displaced movable core 40.

In the above-described electromagnetic valve device 90, when a side force inclines the central axis 0 of the movable core 40, the major diameter portion 404 of the radially displaced movable core 40 collides against the guide wall 92 and presses against the guide wall 92. As a result, the unfixed core side end 922 of the guide wall 92 is deflected through the space 95 outside the guide wall 92 in its radial direction to demonstrate the damping effects. Owing to the damping effects of the guide wall 92, the vibrational energy generated in the guide wall 92, due to impact of the movable core 40, can be attenuated.

(Fifth Embodiment)

Figure 8:
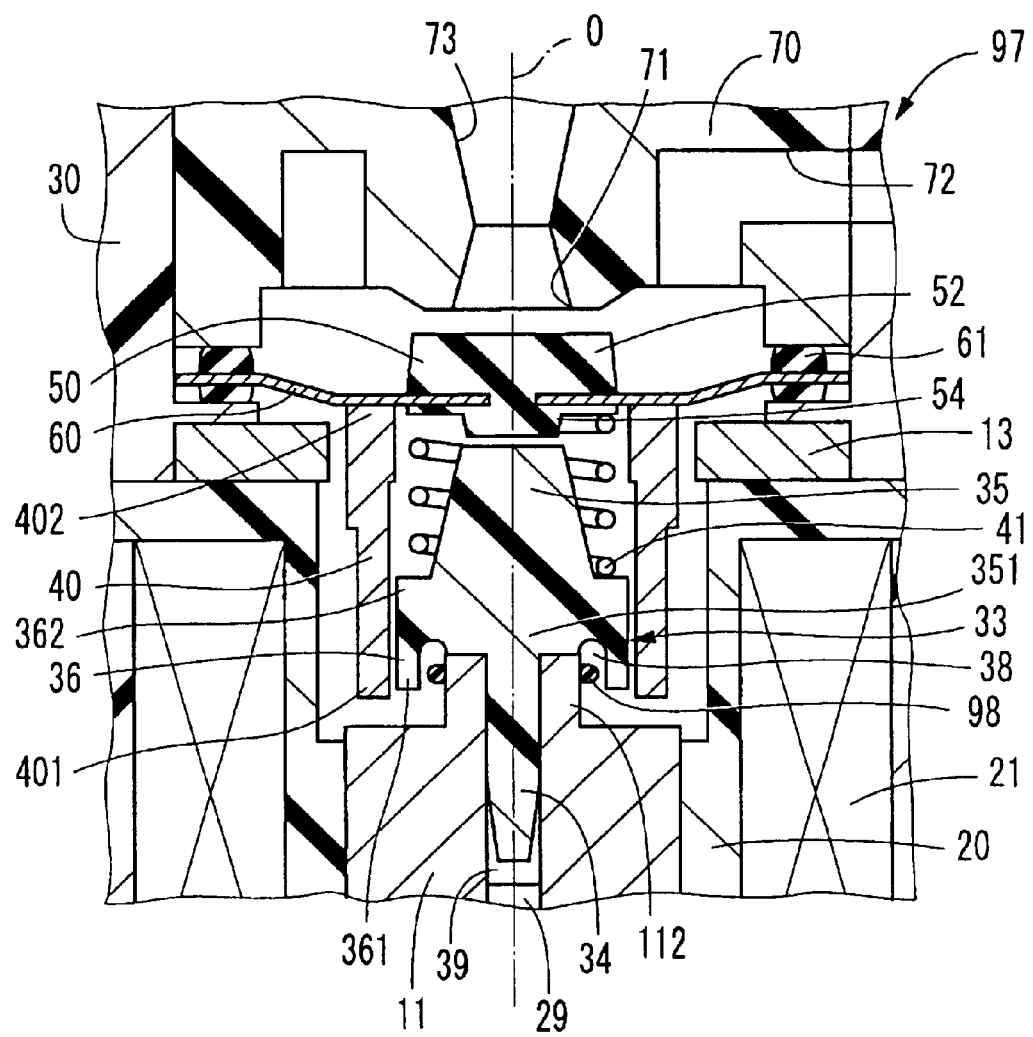
FIG. 8 is a cross-sectional view showing a principal part of an electromagnetic valve device according to a fifth embodiment of the present invention.

FIG. 8 shows an electromagnetic valve device according to a fifth embodiment of the present invention. Components substantially the same as those of the first embodiment are denoted by the same reference numerals.

In an electromagnetic valve device 97 of the fifth embodiment, in addition to the structure of the first embodiment, a circular elastic member 98 is coaxially provided in the space 38 inside the guide wall 36 in its radial direction. The elastic member 98 made of rubber or the like is formed smaller than the space 38. An inner circumferential edge of the elastic member 98 is supported by an outer circumferential wall of the minor diameter portion 112 of the fixed core 11. Although the outer circumferential edge of the elastic member 98 is not supported by the inner circumferential wall of the guide wall 36, the outer circumferential edge of the elastic member 98 may be supported by the inner circumferential wall of the guide wall 36.

In such an electromagnetic valve device 97, when the movable core 40 causes a collision of the fixed core side end 401 against the guide wall 36 due to a side force and presses against the guide wall 36, the fixed core side end 361 of the guide wall 36 is deflected through the space 38. Furthermore, the elastic member 98 is interposed between the deflected fixed core side end 361 and the minor diameter portion 112 and is compressed. As a result, since the damping effects of the elastic member 98 are demonstrated in addition to the damping effects of the guide wall 36, the effects of attenuating the vibrational energy can be enhanced. Even in the case where the elastic member 98 of the fifth embodiment is provided in each of the spaces 38, 88, and 95 of the second to fourth embodiments, similar effects can be obtained.

(Sixth Embodiment)

Figure 9:
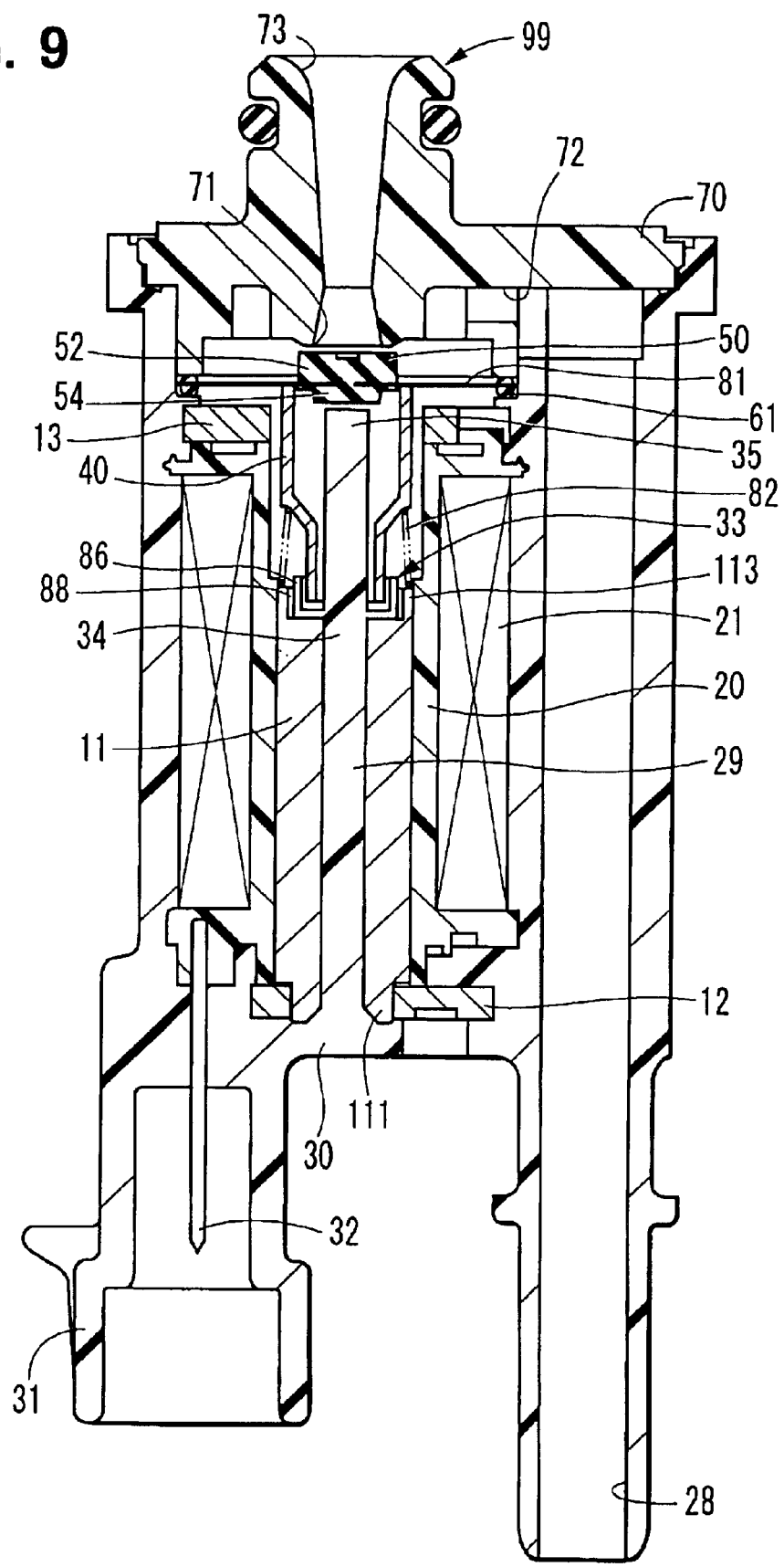
FIG. 9 is a cross-sectional view showing an electromagnetic valve device according to a sixth embodiment of the present invention.

FIG. 9 shows an electromagnetic valve device according to a sixth embodiment of the present invention. Components substantially the same as those of the first and third embodiments are denoted by the same reference numerals.

An electromagnetic valve device 99 of the sixth embodiment differs from that of the third embodiment in that the guide member 33 is formed by integral resin molding with the body 30 and that the held portion 34 is constituted by the filling portion 29. As a result, the fabrication cost may be reduced in this embodiment. In the first, second, and fifth embodiments, when the fixed core side end 361 is used as a connection portion of the guide wall 36 to the regulating section 35 instead of the unfixed core side end 362 so as to form the space 38 inside the unfixed core side end 362 in the radial direction, the guide member 33 can be formed by integral resin molding with the body 30.

Although the guide wall is formed in a cylindrical form that is continuous in the circumferential direction of the movable core in the plurality of embodiments described above, the guide wall can be formed in a form that intermittently extends in the circumferential direction of the movable core.

Although two support members, which are configured so that the rigidity of the movable core in the radial direction is higher than that in the axial direction, are used in the second to fourth and sixth embodiments described above, three or more support members may be used. Furthermore, in the second to fourth and sixth embodiments described above, it is possible to use a structure without a guide wall that is deflected through the space inside or outside the guide wall in the radial direction by pressing the movable core.

What is claimed is:

1. An electromagnetic valve device comprising:
    a fixed core;
    a cylindrical movable core;
    a valve member for reciprocating in an axial direction of the movable core in a cooperative manner with the movable core to open and close a fluid path;
    a coil section for forming a magnetic field by electrical conduction thereof to attract the movable core to the fixed core so as to move the movable core in the axial direction; and
    a guide member having a guide wall for guiding the movable core in the axial direction and from inside or outside of the movable core in its radial direction,
    wherein the guide wall, in the radial direction, defines a space inside the guide wall, wherein the guide wall is for guiding the movable core from the inside in the radial direction, or the guide wall defines a space outside the guide wall in the radial direction, wherein the guide wall is for guiding the movable core from the outside in the radial direction, and
    the guide wall is elastically deformable so as to be deflected through the space when the guide wall is pressed by the movable core being displaced in the radial direction.

2. The electromagnetic valve device according to claim 1, wherein the guide wall and the space are formed so as to be continuous in a circumferential direction about the movable core.

3. The electromagnetic valve device according to claim 1, wherein an elastic member smaller than the space is provided in the space.

4. The electromagnetic valve device according to claim 1, further comprising a body covering the fixed core and the coil section, wherein the guide member is formed separately from the body.

5. The electromagnetic valve device according to claim 3, further comprising a body covering the fixed core and the coil section, wherein the guide member is formed separately from the body.

6. The electromagnetic valve device according to claim 1, further comprising a body covering the fixed core and the coil section, wherein the guide member is formed by integral resin molding with the body.

7. The electromagnetic valve device according to claim 3, further comprising a body covering the fixed core and the coil section, wherein the guide member is formed by integral resin molding with the body.

8. The electromagnetic valve device according to claim 1, further comprising:
    a regulating member for regulating movement of the movable core in the axial direction,
    wherein the guide member is formed by integral resin molding with the regulating member.

9. The electromagnetic valve device according to claim 7, further comprising:
    a regulating member for regulating movement of the movable core in the axial direction,
    wherein the guide member is formed by integral resin molding with the regulating member.

10. The electromagnetic valve device according to claim 1, further comprising:
    a plurality of support members provided so that rigidity of the movable core in the radial direction is higher than that in the axial direction, for supporting a plurality of portions of the movable core in the axial direction, respectively.

11. The electromagnetic valve device according to claim 9, further comprising:
    a plurality of support members provided so that rigidity of the movable core in the radial direction is higher than that in the axial direction, for supporting a plurality of portions of the movable core in the axial direction, respectively.

* * * * *